US010621872B2

(12) United States Patent
Shimizu et al.

(10) Patent No.: US 10,621,872 B2
(45) Date of Patent: Apr. 14, 2020

(54) VEHICLE DISPATCH SYSTEM, VEHICLE DISPATCH APPARATUS USED FOR THE SAME, AND VEHICLE DISPATCH METHOD

(71) Applicant: TOYOTA JIDOSHA KABUSHIKI KAISHA, Toyota-shi, Aichi-ken (JP)

(72) Inventors: Takenori Shimizu, Inuyama (JP); Naoki Kurokawa, Tokyo-to (JP); Junya Watanabe, Shizuoka-ken (JP); Jun Goto, Aichi-ken (JP); Koji Kawasaki, Anjo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/168,283

(22) Filed: Oct. 23, 2018

(65) Prior Publication Data
US 2019/0122561 A1 Apr. 25, 2019

(30) Foreign Application Priority Data
Oct. 25, 2017 (JP) .................................. 2017-206065

(51) Int. Cl.
*G08G 1/00* (2006.01)
*G07C 5/00* (2006.01)
(Continued)

(52) U.S. Cl.
CPC ......... *G08G 1/205* (2013.01); *G01C 21/3469* (2013.01); *G05D 1/0088* (2013.01);
(Continued)

(58) Field of Classification Search
CPC .... G08G 1/205; G08G 1/202; G01C 21/3469; G05D 1/0088; G05D 2201/0213; G07C 5/008
(Continued)

(56) References Cited

U.S. PATENT DOCUMENTS 8,849,499 B2\* 9/2014 Profitt-Brown ........ B60K 35/00
701/31.4
2013/0226441 A1\* 8/2013 Horita ................ G01C 21/3469
701/118
(Continued)

FOREIGN PATENT DOCUMENTS

JP 2015-092320 A 5/2015
JP 2018-128799 A 8/2018

*Primary Examiner* — Hirdepal Singh
(74) *Attorney, Agent, or Firm* — Hunton Andrews Kurth LLP

(57) ABSTRACT

If a vehicle with a user on board becomes undrivable due to insufficient power, a server uses first information, second information, and third information to set a vehicle-switching location between a current location of the vehicle and a destination, and dispatches a vehicle to the vehicle-switching location. When the vehicle joins the vehicle at the vehicle-switching location, the vehicle travels toward the destination with the user on board. After the user gets off the vehicle, the vehicle travels by self-driving toward a charging station. The first information is positional information of the charging station. The second information is information on a self-driving route of the vehicle from the vehicle-switching location to the charging station. The third information is information indicating reliability about whether or not the vehicle can arrive at the charging station by self-driving.

7 Claims, 10 Drawing Sheets

(51) Int. Cl.
*G01C 21/34* (2006.01)
*G05D 1/00* (2006.01)

(52) U.S. Cl.
CPC ............ *G07C 5/008* (2013.01); *G08G 1/202* (2013.01); *G05D 2201/0213* (2013.01)

(58) Field of Classification Search
USPC ........................................................ 340/989
See application file for complete search history.

(56) References Cited

U.S. PATENT DOCUMENTS

| | | | |
|---|---|---|---|
| 2016/0093216 A1* | 3/2016 | Lee | G06Q 10/063114 |
| | | | 340/870.11 |
| 2017/0140603 A1* | 5/2017 | Ricci | B60L 11/182 |
| 2017/0146354 A1* | 5/2017 | Boss | B60L 58/12 |
| 2018/0143029 A1* | 5/2018 | Nikulin | G01C 21/3469 |
| 2018/0209803 A1* | 7/2018 | Rakah | G08G 1/096844 |
| 2018/0216947 A1* | 8/2018 | Sakata | G01C 21/3685 |
| 2018/0224858 A1 | 8/2018 | Watanabe et al. | |
| 2018/0238698 A1* | 8/2018 | Pedersen | B60L 58/16 |

* cited by examiner

FIG.6

<VEHICLE INFORMATION>

| VEHICLE ID | VEHICLE TYPE | STATUS OF USE | | | | CURRENT LOCATION | DESTINATION | SOC | ELECTRICITY EFFICIENCY |
|---|---|---|---|---|---|---|---|---|---|
| | | ON BOARD | TRAVELING FOR PICKUP | OUT OF SERVICE | CHARGING | | | | |
| 1 | | Y | | | | P1 | D | S1 | Ah1 |
| 2 | | | | Y | | P2 | – | S2 | Ah2 |
| 3 | | | | | Y | P3 | – | S3 | Ah3 |
| 4 | | | | Y | | P4 | – | S4 | Ah4 |
| ⋮ | | | | | | | | | |

FIG.8

| VEHICLE ID | CANDIDATE LOCATION | REQUIRED PERIOD OF TIME | |
|---|---|---|---|
| 2 | Ta | ta2 | 10 MIN |
| 2 | Tb | tb2 | 15 MIN |
| 2 | Tc | tc2 | 17 MIN |

FIG.9

<CHARGING INFORMATION>

| CHARGING STATION ID | POSITION | NUMBER OF CHARGERS |
|---|---|---|
| st1 | | |
| st2 | | |
| st3 | | |
| ⋮ | | |

FIG.10

| VEHICLE ID | CANDIDATE LOCATION | REQUIRED PERIOD OF TIME | | CHARGING STATION | TRAVELING ROUTE |
|---|---|---|---|---|---|
| 1 | Ta | ta1 | 4 MIN | st2 | |
| 1 | Tb | tb1 | 11 MIN | st2 | |
| 1 | Tc | tc1 | 18 MIN | st3 | |

FIG.11

| VEHICLE ID | CANDIDATE LOCATION | REQUIRED PERIOD OF TIME OF USER VEHICLE | | REQUIRED PERIOD OF TIME OF PICKUP VEHICLE | | TIME DIFFERENCE | EVALUATION |
| --- | --- | --- | --- | --- | --- | --- | --- |
| 2 | Ta | ta1 | 4 MIN | ta2 | 10 MIN | -6 MIN | NG |
| 2 | Tb | tb1 | 11 MIN | tb2 | 15 MIN | -4 MIN | NG |
| 2 | Tc | tc1 | 18 MIN | tc2 | 17 MIN | 1 MIN | OK |
| 4 | Td | td1 | 5 MIN | td4 | 7 MIN | -2 MIN | OK |
| 4 | Te | te1 | 9 MIN | te4 | 13 MIN | -4 MIN | NG |
| 4 | Tf | tf1 | 18 MIN | tf4 | 15 MIN | 3 MIN | OK |

FIG.12

<SELF-DRIVING INFORMATION>

| ROUTE ID | SELF-DRIVING MAP | SELF-DRIVING HISTORY | TRAFFIC VOLUME | RELIABILITY INDEX |
| --- | --- | --- | --- | --- |
| R1001 | AVAILABLE | 8 | 8 | 8 |
| R1002 | AVAILABLE | 5 | 3 | 4 |
| R1003 | UNAVAILABLE | - | 5 | 2 |
| R1004 | AVAILABLE | 6 | 2 | 5 |
| ⁝ | | | | |

VEHICLE DISPATCH SYSTEM, VEHICLE DISPATCH APPARATUS USED FOR THE SAME, AND VEHICLE DISPATCH METHOD

This nonprovisional application is based on Japanese Patent Application No. 2017-206065 filed on Oct. 25, 2017 with the Japan Patent Office, the entire content of which is hereby incorporated by reference.

BACKGROUND

Field

The present disclosure relates to a vehicle dispatch system, a vehicle dispatch apparatus used for the same, and a vehicle dispatch method, and more particularly to a technology for dispatching an electric vehicle configured to perform self-driving (or unmanned driving).

Description of the Background Art

In recent years, various technologies related to dispatching an electric vehicle have been proposed. There is concern that an electric vehicle may become undrivable due to insufficient remaining power amount (hereinafter referred to as a "remaining amount" for short) in a power storage device. It usually takes some time to charge the power storage device having only a small remaining amount. Accordingly, if a vehicle makes a stop at a charging station due to an insufficient remaining amount on the way to a destination for example, the arrival at the destination may be delayed.

In view of such circumstances, for example Japanese Patent Laying-Open No. 2015-092320 discloses a technology of controlling two vehicles to join each other. If a first vehicle with a user or luggage on board becomes undrivable (or is highly likely to become undrivable) due to an insufficient remaining amount, a second vehicle different from the first vehicle is dispatched to the joining location.

If the first vehicle is determined to be incapable of traveling under its own power to a charging station, the first vehicle and the second vehicle are coupled with each other and travel together toward the destination. On the other hand, if the first vehicle is determined to be capable of traveling under its own power to a charging station, the second vehicle, instead of the first vehicle, travels toward the destination with the user or luggage that has been carried by the first vehicle on board. In this case, the first vehicle moves to a charging station (see Japanese Patent Laying-Open No. 2015-092320, paragraphs [0083] and [0089]).

SUMMARY

According to Japanese Patent Laying-Open No. 2015-092320, it is determined whether or not the first vehicle is capable of traveling under its own power from the joining location to a charging station, based on the information indicating the remaining amount in the power storage device of the first vehicle, and based on the information indicating the electricity consumption in recent predetermined period of time (e.g. 10 minutes) of the first vehicle (see, for example, Japanese Patent Laying-Open No. 2015-092320, paragraphs [0077], [0081], and [0097] and claim 11).

However, whether or not the first vehicle is capable of traveling under its own power to a charging station is not necessarily defined merely by the information on the remaining amount in the power storage device and the information on the electricity consumption in recent predetermined period of time, and Japanese Patent Laying-Open No. 2015-092320 does not consider other information for the first vehicle to travel under its own power. If the first vehicle is unable to arrive at a charging station, the first vehicle cannot be dispatched to a next user, which may interfere with continuous management of the vehicle dispatch system. In this respect, there is room for improvement in the technology disclosed in Japanese Patent Laying-Open No. 2015-092320.

An object of the present disclosure, which has been made to solve the above problem, is to provide a technology for enabling continuous management of the dispatch of an electric vehicle configured to perform self-driving.

(1) A vehicle dispatch system according to an aspect of the present disclosure includes: a first vehicle and a second vehicle, each of which is an electric vehicle including a power storage device and configured to perform self-driving; and a server configured to communicate with the first vehicle and the second vehicle. If the first vehicle with a user on board becomes undrivable due to insufficient power in the power storage device before arriving at a destination, the server is configured to: use first information, second information, and third information to set a vehicle-switching location between a current location of the first vehicle and the destination, the vehicle-switching location being a location where the user switches from the first vehicle to the second vehicle; and send an instruction for dispatching the second vehicle to the vehicle-switching location. After the second vehicle joins the first vehicle at the vehicle-switching location in accordance with the instruction, the second vehicle travels toward the destination with the user on board. After the user gets off the first vehicle, the first vehicle travels by self-driving toward charging equipment capable of charging the power storage device. The first information is positional information of the charging equipment. The second information is information on a self-driving route of the first vehicle from the vehicle-switching location to the charging equipment. The third information is information on an index value indicating reliability about whether or not the first vehicle can arrive at the charging equipment by self-driving by the self-driving route. The server is configured to determine the vehicle-switching location using the index value.

According to the configuration of the above (1), in setting a vehicle-switching location, consideration is given to information (third information) on an "index value" indicating reliability about whether or not the first vehicle can arrive at the charging equipment by self-driving by the self-driving route. For example, with respect to a self-driving route from a vehicle-switching location to charging equipment, the information on an index value includes: information on presence or absence of a map for self-driving created in advance; information on the number of self-driving vehicles that traveled by the route in the past; and information on a traffic volume of the route. Using such information enables the first vehicle to reliably arrive at the charging equipment by self-driving. Thus, the power storage device can be charged at the charging equipment, and the first vehicle can be dispatched for a next user. As a result, the vehicle dispatch system can be continuously managed.

(2) Preferably, if there is a plurality of candidates for the vehicle-switching location, the server is configured to determine a candidate having the highest index value, to be the vehicle-switching location.

According to the configuration of the above (2), a candidate having the highest index value is selected. Therefore, the first vehicle can more reliably arrive at the charging equipment by self-driving.

(3) Preferably, if there are a plurality of candidates for the vehicle-switching location having the index value higher than a reference value, the server is configured to determine a candidate having a smallest time difference between an arrival time of the first vehicle at the vehicle-switching location and an arrival time of the second vehicle at the vehicle-switching location, to be the vehicle-switching location.

According to the configuration of the above (3), a candidate having the smallest time difference is selected. This can reduce the possibility that a vehicle (one of the first vehicle and the second vehicle) may occupy a parking space during vehicle switching and may obstruct other vehicles' traveling.

(4) Preferably, the vehicle dispatch system further includes an input/output device (e.g. a portable terminal of the user or a navigation device) configured to provide the user with information received from the server via communication with the server, and receive an operation from the user. If there are a plurality of candidates for the vehicle-switching location having the index value higher than a reference value, the input/output device is configured to receive the operation from the user for selecting a candidate from among the plurality of candidates and send a result of the received operation to the server. The server is configured to determine the candidate selected by the user, to be the vehicle-switching location.

According to the configuration of the above (4), reception of a selection by the user enables selection of a vehicle-switching location having a small time difference between the arrival time of the first vehicle and the arrival time of the second vehicle (i.e., having short waiting time), for example.

(5) Preferably, the first vehicle includes a first coupler. The second vehicle includes a second coupler configured to couple with the first coupler, and a detection device configured to detect the user getting on the second vehicle. The first vehicle and the second vehicle join each other with the first coupler and the second coupler coupling with each other at the vehicle-switching location. When the detection device detects the user getting on the second vehicle, the second vehicle is configured to release coupling between the first coupler and the second coupler and starts traveling by self-driving.

According to the configuration of the above (5), coupling the first vehicle and the second vehicle with each other enables detailed determination of the parking positions of the first and second vehicles. Further, since the first and second vehicles are parked close to each other, the user can conveniently switch vehicles and the first and second vehicles are prevented from obstructing other vehicles' traveling.

(6) A vehicle dispatch apparatus according to another aspect of the present disclosure includes a communication device and a processor. The communication device is configured to communicate with a first vehicle and a second vehicle, each of which is an electric vehicle configured to perform self-driving. The processor is configured to, if the first vehicle with a user on board becomes undrivable due to insufficient power in a power storage device before arriving at a destination, use first information, second information, and third information to set a vehicle-switching location between a current location of the first vehicle and the destination, the vehicle-switching location being a location where the user switches from the first vehicle to the second vehicle; and send an instruction for dispatching the second vehicle to the vehicle-switching location. After the second vehicle joins the first vehicle at the vehicle-switching location in accordance with the instruction, the second vehicle travels toward the destination with the user on board. After the user gets off the first vehicle, the first vehicle travels by self-driving toward charging equipment capable of charging the power storage device. The first information is positional information of the charging equipment. The second information is information on a self-driving route of the first vehicle from the vehicle-switching location to the charging equipment. The third information is information on an index value indicating reliability about whether or not the first vehicle can arrive at the charging equipment by self-driving by the self-driving route. The processor is configured to determine the vehicle-switching location using the index value.

According to the configuration of the above (6), the dispatch of an electric vehicle configured to perform self-driving can be continuously managed, as in the configuration of the above (1).

(7) A vehicle dispatch method according to another aspect of the present disclosure is a vehicle dispatch method for a first vehicle and a second vehicle, each of which is an electric vehicle configured to perform self-driving. The vehicle dispatch method includes first to fourth steps if the first vehicle with a user on board becomes undrivable due to insufficient power in a power storage device before arriving at a destination. The first step is a step of using information to set a vehicle-switching location between a current location of the first vehicle and the destination, the vehicle-switching location being a location where the user switches from the first vehicle to the second vehicle, the information being on an index value indicating reliability about whether or not the first vehicle can travel by self-driving from the vehicle-switching location to arrive at charging equipment capable of charging the power storage device. The second step is a step of sending an instruction for dispatching the second vehicle to the vehicle-switching location. The third step is a step of allowing the second vehicle that has joined the first vehicle at the vehicle-switching location in accordance with the instruction to travel toward the destination with the user on board. The fourth step is a step of allowing the first vehicle to travel by self-driving toward the charging equipment after the user gets off the first vehicle.

According to the method of the above (7), the dispatch of an electric vehicle configured to perform self-driving can be continuously performed, as in the configurations of the above (1) and (6).

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram showing an example data structure of vehicle information.

FIG. 8 is a diagram showing example results of calculation by a second vehicle.

FIG. 9 is a diagram showing an example data structure of charging information.

FIG. 10 is a diagram showing example results of calculation by a first vehicle (information I1).

FIG. 11 is a diagram showing an example method, by a server, of narrowing down the candidate switched vehicles and the candidate vehicle-switching locations.

FIG. 12 is a diagram showing an example data structure of self-driving information.

DESCRIPTION OF THE PREFERRED EMBODIMENT

Figure 1:
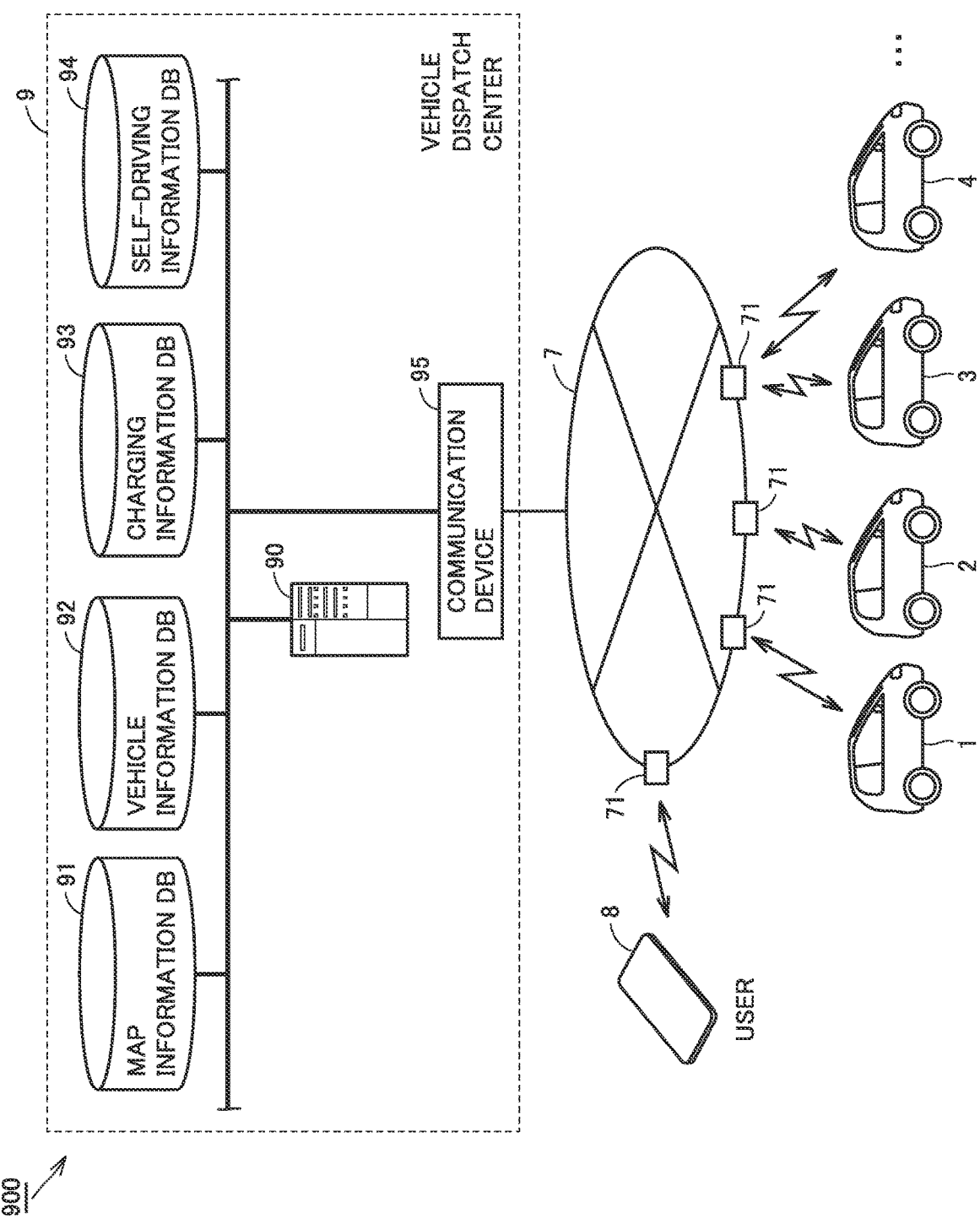
FIG. 1 is a diagram schematically showing a general configuration of a vehicle dispatch system according to the present embodiment.

An embodiment of the present disclosure is described in detail hereinafter with reference to the drawings. Identical or corresponding parts in the drawings are identically denoted, and the explanation thereof is not repeated.

Embodiment

<General Configuration of Vehicle Dispatch System>

FIG. 1 is a diagram schematically showing a general configuration of a vehicle dispatch system according to the present embodiment. With reference to FIG. 1, a vehicle dispatch system 900 includes a plurality of vehicles and a vehicle dispatch center 9. Vehicle dispatch center 9 selects appropriate one of the plurality of vehicles in response to a vehicle dispatch request from a portable terminal 8 (for example, a smartphone) of a user, and dispatches the selected vehicle to the user's current location (or a location appointed by the user).

Although only four vehicles 1 to 4 are shown in FIG. 1 to avoid complexity of the figure, the number of vehicles may be any number more than or equal to two. In many cases, a large number (for example, several tens to several thousands) of vehicles are included in vehicle dispatch system 900.

Each of vehicles 1 to 4 is an electric vehicle (EV) configured to perform automated driving without a driver (hereinafter referred to as "self-driving"). Self-driving refers to the control in which driving operations, such as acceleration, deceleration, stopping, and steering of a vehicle, are performed without a vehicle driver's operation. Self-driving includes, for example, the lane keeping control and the navigation control. In the lane keeping control, a handle (not shown) is automatically steered so that the vehicle can travel along a driving lane without deviating from the driving lane. In the navigation control, if there is no vehicle in front of the vehicle, the constant-speed control is executed in which the vehicle is controlled to travel at a constant preset speed; whereas, if there is a vehicle in front of the vehicle, the follow-up control is executed in which the vehicle speed is adjusted in accordance with the distance from the vehicle in front.

A large number of vehicles including vehicles 1 to 4 and vehicle dispatch center 9 are configured to perform two-way communication with a base station 71 of a communication network 7, and send and receive various types of information via wireless communication. Vehicle dispatch center 9, which manages the traveling status of each of vehicles 1 to 4, provides necessary information to vehicles 1 to 4 and sends various instructions to vehicles 1 to 4. Vehicle dispatch center 9 includes a server 90, a map information data base 91, a vehicle information data base 92, a charging information data base 93, a self-driving information data base 94, and a communication device 95.

Map information data base 91 stores road map data. Vehicle information data base 92 stores positional information of a plurality of vehicles including vehicles 1 to 4, and information indicating a status of use of each vehicle (also collectively referred to as "vehicle information") (see FIG. 6). Charging information data base 93 stores information such as positional information of a charging station S (see FIG. 2) for charging an electrically powered vehicle (e.g. an electric vehicle and a plug-in hybrid vehicle) (hereinafter also collectively referred to as "charging information") (see FIG. 9). Self-driving information data base 94 stores information for self-driving of each vehicle (self-driving information) (see FIG. 12).

Server 90 is a processor for executing various types of processes for dispatching an appropriate one of vehicles 1 to 4 to a user's location in response to a request from the user. The information (data) contained in each data base and the processes by server 90 are described in detail later.

<Configuration of Vehicle>

Vehicles 1 to 4 basically have the same configuration, and the configuration of vehicle 1 is hereinafter representatively described.

Figure 2:
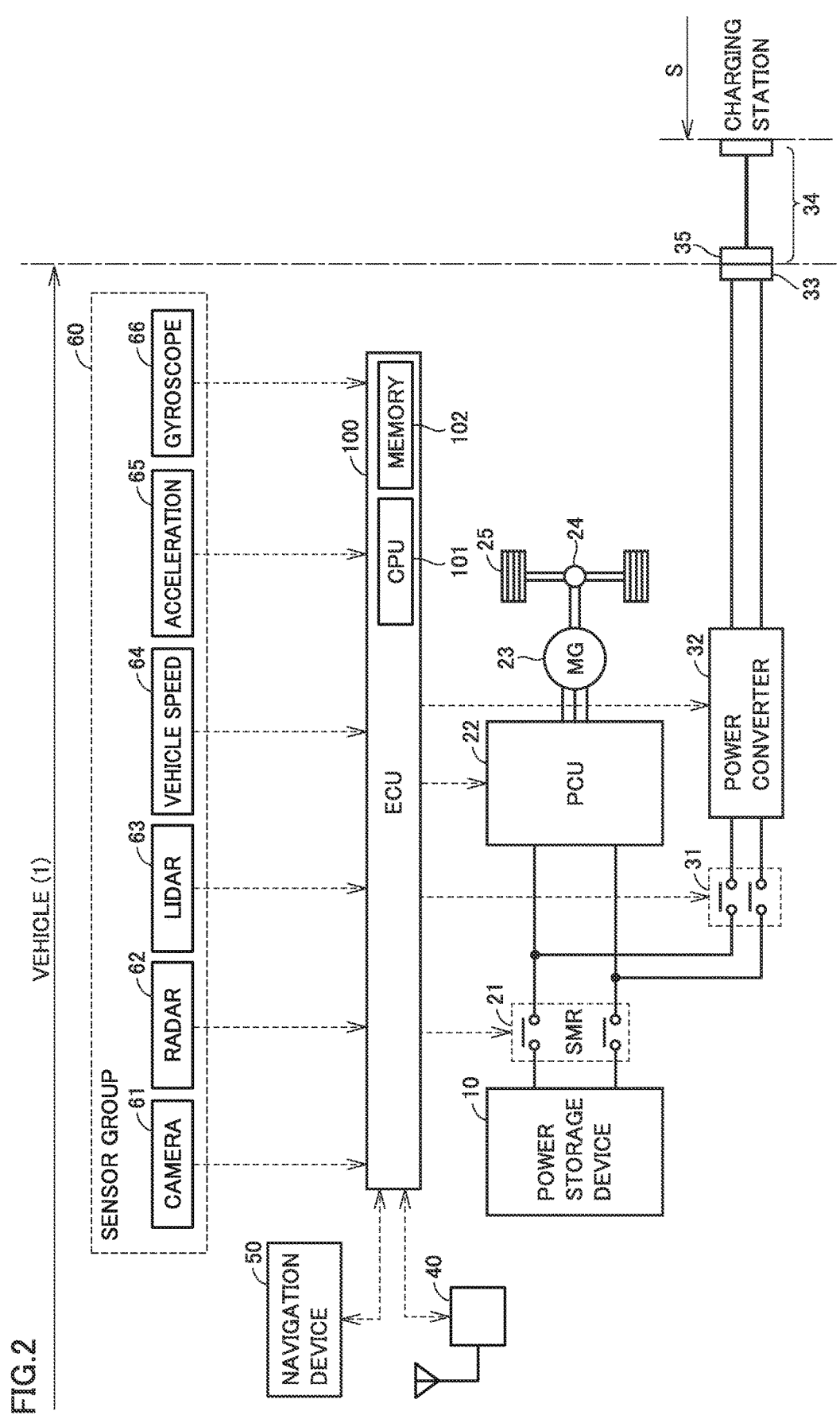
FIG. 2 is a diagram schematically showing a configuration of a first vehicle.

FIG. 2 is a diagram schematically showing a configuration of vehicle 1. With reference to FIG. 2, vehicle 1 includes a power storage device 10, a system main relay (SMR) 21, a power control unit (PCU) 22, a motor generator (MG) 23, a drive-train gear 24, a driving wheel 25, and an electronic control unit (ECU) 100.

Power storage device 10 is a rechargeable DC power supply including a secondary battery, such as a lithium-ion secondary battery or a nickel-hydrogen battery. A capacitor, such as an electric double layer capacitor, may also be used as power storage device 10. Power storage device 10 supplies PCU 22 with power for generating the force for driving vehicle 1. Power storage device 10 is charged with power generated by regenerative braking of motor generator 23, and is charged with power supplied from the outside of the vehicle.

SMR 21 is electrically connected between power storage device 10 and PCU 22. The closing and opening of SMR 21 are controlled in accordance with the instructions from ECU 100.

PCU 22 performs power conversion between power storage device 10 and motor generator 23 in accordance with the instructions from ECU 100. PCU 22 includes an inverter configured to receive power from power storage device 10 to drive motor generator 23, and a converter configured to adjust the level of DC voltage supplied to the inverter (all not shown).

Motor generator 23 is an AC motor, such as a permanent-magnet-type synchronous motor having a rotor with an embedded permanent magnet. Motor generator 23 is driven by the inverter included in PCU 22 and rotates a drive shaft (not shown). The torque output from motor generator 23 is transmitted to driving wheel 25 through drive-train gear 24, thereby allowing vehicle 1 to travel. At the time of braking of the vehicle, motor generator 23 receives the rotatory power of the driving wheel and generates power. The power generated by motor generator 23 is stored in power storage device 10 through PCU 22.

Vehicle 1 further includes a charging relay 31, a power converter 32, and an inlet 33, as a configuration for charging (so-called external charging) of power storage device 10 with power from the outside of the vehicle. At the time of external charging of power storage device 10, a charging connector 35 of a charging cable 34 is coupled with inlet 33. Power supplied from, for example, charging station S is supplied to vehicle 1 through charging cable 34.

Charging relay 31 is electrically connected between power storage device 10 and power converter 32. When charging relay 31 is closed and SMR 21 is closed, then power transmission between inlet 33 and power storage device 10 is ready.

Power converter 32 is electrically connected between charging relay 31 and inlet 33. Power converter 32 converts power supplied from, for example, charging station S into power with which to charge power storage device 10, in accordance with the instructions from ECU 100. Power converter 32 also can convert power from power storage device 10 into power that can be output to the outside of the vehicle.

Vehicle 1 further includes a communication module 40, a navigation device 50, and a sensor group 60, as a configuration for detecting a situation outside vehicle 1 or a traveling state of vehicle 1 and communicating with the outside of the vehicle. Sensor group 60 includes a camera 61, radar 62, laser imaging detection and ranging (LIDAR) 63, a vehicle speed sensor 64, an acceleration sensor 65, and a gyroscope sensor 66.

Communication module 40 is an on-vehicle data communication module (DCM) and is configured to allow two-way data communication between ECU 100 and server 90 in vehicle dispatch center 9.

Navigation device 50 includes a GPS receiver (not shown) configured to identify a current location of vehicle 1 based on radio waves from artificial satellites. Navigation device 50 executes various types of navigation processes of vehicle 1 using positional information (GPS information) of a current location of vehicle 1 identified by the GPS receiver. Specifically, navigation device 50 calculates a traveling route (expected traveling route or target route) from a current location of vehicle 1 to a destination based on the GPS information of vehicle 1 and road map data stored in a memory (not shown), and outputs information on the traveling route to ECU 100.

Navigation device 50 includes a display unit and an input unit (not shown) configured with a liquid crystal panel with a touch panel. The display unit displays a current location of vehicle 1 superimposed on a road map, and displays the information sent from server 90 to vehicle 1 or the information from ECU 100. The input unit receives various operations from a user. Navigation device 50 corresponds to one example of an "input/output device" according to the present disclosure. The "input/output device" may be portable terminal 8 of a user.

Sensor group 60 detects a situation outside vehicle 1, and detects the traveling state information of vehicle 1 and the operation of vehicle 1 (a steering operation, an accelerating operation, and a braking operation). ECU 100 is configured to perform self-driving (full-automated driving or automatic traveling for returning to the depot) based on various types of information detected (or obtained) by sensor group 60. That is, in the self-driving with sensor group 60, a driver is required to neither ride on nor operate the vehicle under any situation.

Camera 61 captures an image of a situation outside vehicle 1 and outputs, to ECU 100, the captured-image information regarding the situation outside vehicle 1.

Radar 62 sends a radio wave (for example, millimeter wave) to surroundings of vehicle 1 and receives a radio wave reflected by an obstacle to detect the obstacle. The radar outputs, to ECU 100, a distance to the obstacle and a direction of the obstacle as obstacle information regarding the obstacle, for example.

LIDAR 63 transmits light (typically, ultraviolet rays, visible rays, or near infrared rays) to surroundings of vehicle 1 and receives light reflected by an obstacle to measure a distance to the reflecting point and detect the obstacle. LIDAR 63 outputs, to ECU 100, the distance to the obstacle and a direction of the obstacle as obstacle information, for example.

Vehicle speed sensor 64 is provided at a wheel of vehicle 1 or a drive shaft. Vehicle speed sensor 64 detects a rotating speed of the wheel, and outputs vehicle speed information including the speed of vehicle 1 to ECU 100.

Acceleration sensor 65 includes: a forward/backward acceleration sensor configured to detect acceleration in a forward/backward direction of vehicle 1; and a lateral acceleration sensor configured to detect lateral acceleration of vehicle 1, for example. Acceleration sensor 65 outputs acceleration information including both the accelerations to ECU 100.

Gyroscope sensor 66 detects the gradient of vehicle 1 relative to the horizontal direction, and outputs gradient information of a traveling path of vehicle 1 to ECU 100.

ECU 100 includes a central processing unit (CPU) 101, a memory 102, and an input/output port (not shown) for inputting and outputting various types of signals. ECU 100 executes various types of control (e.g. lane keeping control, navigation control, and vehicle stopping control) for implementing self-driving of vehicle 1, based on the inputs from sensor group 60. ECU 100 also sends various pieces of information (e.g. positional information of vehicle 1) to server 90 and receives instructions or notifications from server 90, via communication module 40.

<Vehicle-Switching Control>

There is concern that vehicle 1, an electric vehicle, may become undrivable due to an insufficient remaining amount (or state of charge, SOC) in power storage device 10. It usually takes some time to charge the power storage device having only a small remaining amount. Accordingly, if vehicle 1 makes a stop at charging station S due to an insufficient remaining amount on the way to a destination D for example, the arrival at destination D may be delayed. In view of such circumstances, the present embodiment implements "vehicle-switching control" for early arrival at destination D by utilizing an additional vehicle different from vehicle 1.

Figure 3:
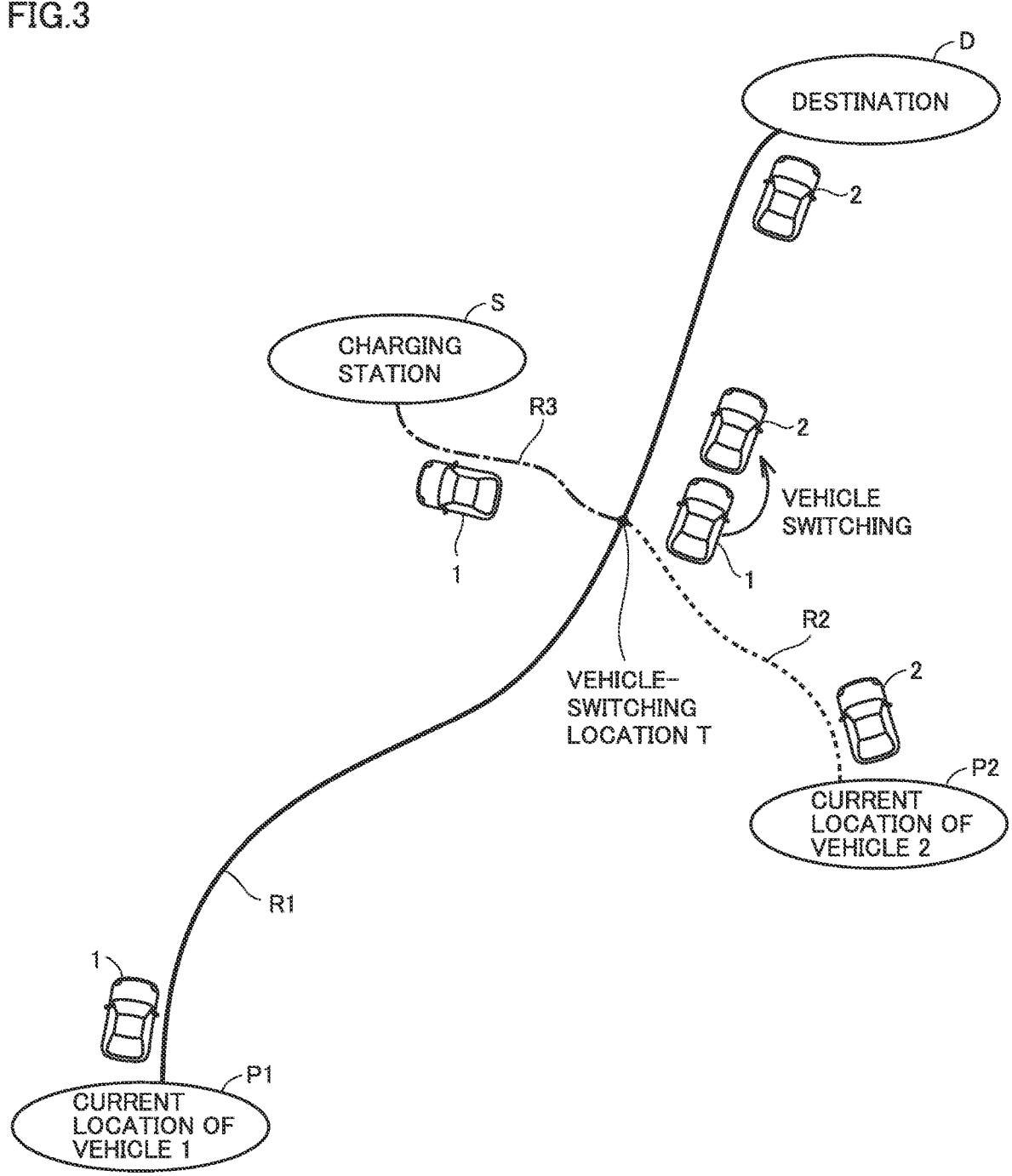
FIG. 3 is a diagram for explaining the outline of the vehicle-switching control in the present embodiment.

FIG. 3 is a diagram for explaining the outline of the vehicle-switching control in the present embodiment. With reference to FIG. 3, the present embodiment describes a case in which a user is riding on vehicle 1 and moving to destination D on a traveling route R1, for the sake of simplicity of the explanation. Here, a situation is assumed in which vehicle 1 is highly likely to become undrivable due to an insufficient remaining amount in power storage device 10 during the driving.

In such a case, the vehicle-switching control is executed so that another vehicle (for example, vehicle 2) is dispatched to a vehicle-switching location T on traveling route R1. A method of determining vehicle-switching location T will be described in detail later. When vehicles 1 and 2 join at vehicle-switching location T, the user switches from vehicle 1 to vehicle 2. Vehicle 2 then travels toward destination D with the user on board. Vehicle 1, on the other hand, travels toward charging station S near vehicle-switching location T. When vehicle 1 arrives at charging station S, power storage device 10 of vehicle 1 is externally charged. If the remaining amount in power storage device 10 turns out to be insufficient before the user gets on vehicle 1, vehicle 2 may be dispatched before vehicle 1 starts traveling.

<Sequence of Vehicle-Switching Control>

The details of the vehicle-switching control will now be described with reference to the sequence diagram.

Figure 4:
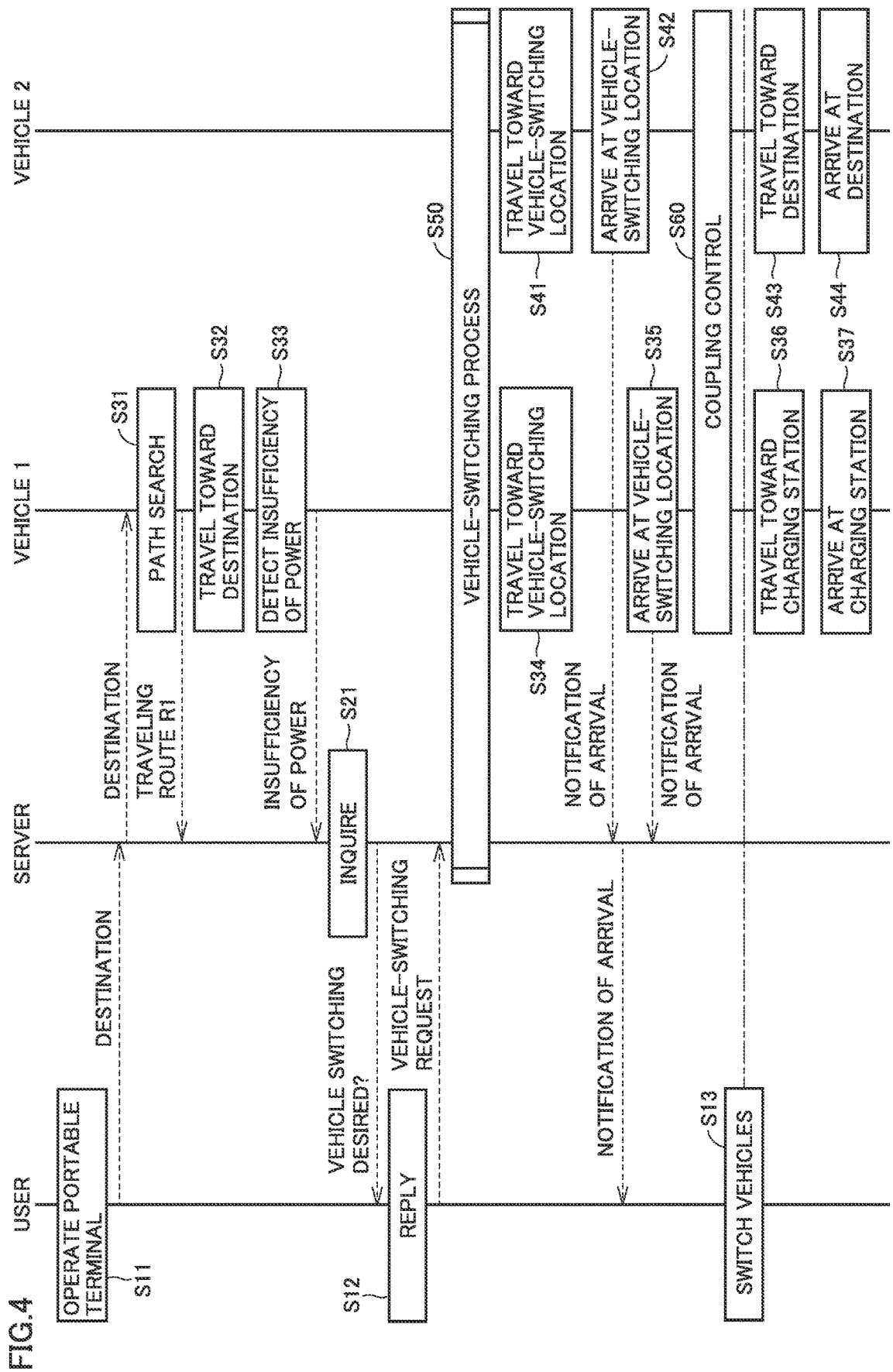
FIG. 4 is a sequence diagram of the vehicle-switching control in the present embodiment.

FIG. 4 is a sequence diagram of the vehicle-switching control in the present embodiment. The sequence diagram shown in FIG. 4 is executed when, for example, a user gets on vehicle 1. FIG. 4 describes the processes which are executed by the user (portable terminal 8 of the user), server 90, vehicle 1, and vehicle 2 in order from left to right in the figure.

With reference to FIG. 1 to FIG. 4, the user operates portable terminal 8 to input destination D first, for example (S11). The positional information of destination D (destination information) is sent to server 90 and is further sent from server 90 to vehicle 1. Note that the user may operate navigation device 50 of vehicle 1 to directly input a destination. In this case, the destination information is sent from vehicle 1 to server 90.

By conducting a path search, vehicle 1 calculates traveling route R1 from a current location P1 of vehicle 1 to destination D, and sends information on traveling route R1 to server 90 (S31). The calculation of traveling route R1 may be performed using a common path search technology for a navigation device, and thus is not explained in detail.

After that, vehicle 1 starts traveling toward destination D (S32). If the SOC of power storage device 10 reduces during the travel and vehicle 1 is determined to be incapable of arriving at destination D under the power stored in power storage device 10 (S33), then vehicle 1 notifies server 90 that the power is insufficient (or the power is highly likely to become insufficient). Whether the power in power storage device 10 mounted on vehicle 1 is insufficient may be determined by vehicle 1, or may be determined by server 90 based on information on the SOC of power storage device 10 and information on the electricity efficiency (i.e., the amount of power consumed for traveling per unit distance) of vehicle 1.

When receiving the notification from vehicle 1, server 90 inquires of portable terminal 8 of the user whether or not the user desires the execution of the vehicle-switching control (S21). If the user expresses a desire for the execution of the vehicle-switching control by operating portable terminal 8 (S12), a vehicle-switching request is sent from portable terminal 8 to server 90.

In response to the vehicle-switching request from the user, server 90 executes the "vehicle-switching process" for selecting a vehicle for dispatch from among a plurality of vehicles (vehicles 2 to 4) located near traveling route R1, and for determining vehicle-switching location T (S50).

Figure 5:
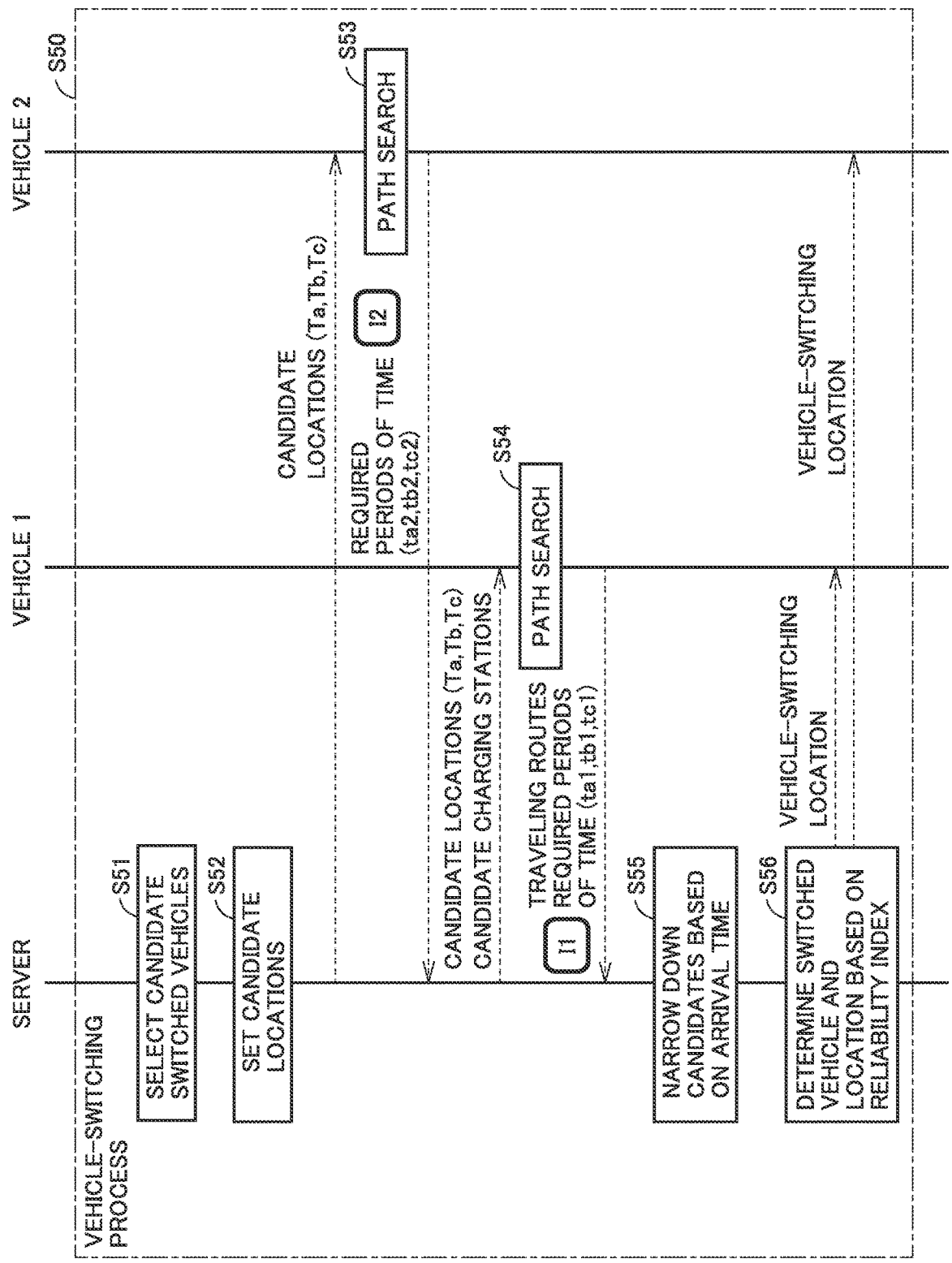
FIG. 5 is a sequence diagram for explaining in detail the vehicle-switching process (the process at S50) shown in FIG. 4.

FIG. 5 is a sequence diagram for explaining in detail the vehicle-switching process (the process at S50) shown in FIG. 4. With reference to FIG. 5, server 90 selects at least one candidate for a vehicle to which the user may switch (hereinafter also referred to as a "switched vehicle" for short) (S51). Also, server 90 sets at least one candidate location at which the vehicle switching from vehicle 1 may be performed on traveling route R1 of vehicle 1 (hereinafter also referred to as a "candidate location" for short) (S52). For selecting a switched vehicle, the vehicle information contained in vehicle information data base 92 is used.

FIG. 6 is a diagram showing an example data structure of the vehicle information. As shown in FIG. 6, the vehicle information includes: identification information (ID) of a vehicle; information on a vehicle type; information on a status of use of a vehicle; positional information of a current location and a destination of a vehicle; and information on a current SOC value of a vehicle, and on an actual value of electricity efficiency, for example. The information on a status of use of a vehicle includes: information indicating that a vehicle is traveling toward a destination with a user on board (riding); information indicating that a vehicle is traveling toward a user's location (traveling for pickup); information indicating that a vehicle is out of service (including being on standby); and information indicating that a vehicle is being externally charged, for example.

The example shown in FIG. 5 and FIG. 6 illustrates a case in which vehicles 2 to 4 have turned out to be in the vicinity of traveling route R1 of vehicle 1, based on the positional information of the current locations of these vehicles. In this example, vehicle 3 is being externally charged and thus is not available for vehicle switching from vehicle 1. Accordingly, for each of vehicles 2 and 4 other than vehicle 3, server 90 determines whether or not the vehicle is capable of traveling to destination D after the vehicle switching from vehicle 1, based on the SOC and the electricity efficiency of power storage device 10. In this example, each of vehicles 2 and 4 has sufficient power stored in its power storage device 10 and is capable of traveling to destination D. Thus, the candidate switched vehicles are vehicles 2 and 4. Therefore, candidate locations are set with respect to vehicles 2 and 4.

Figure 7:
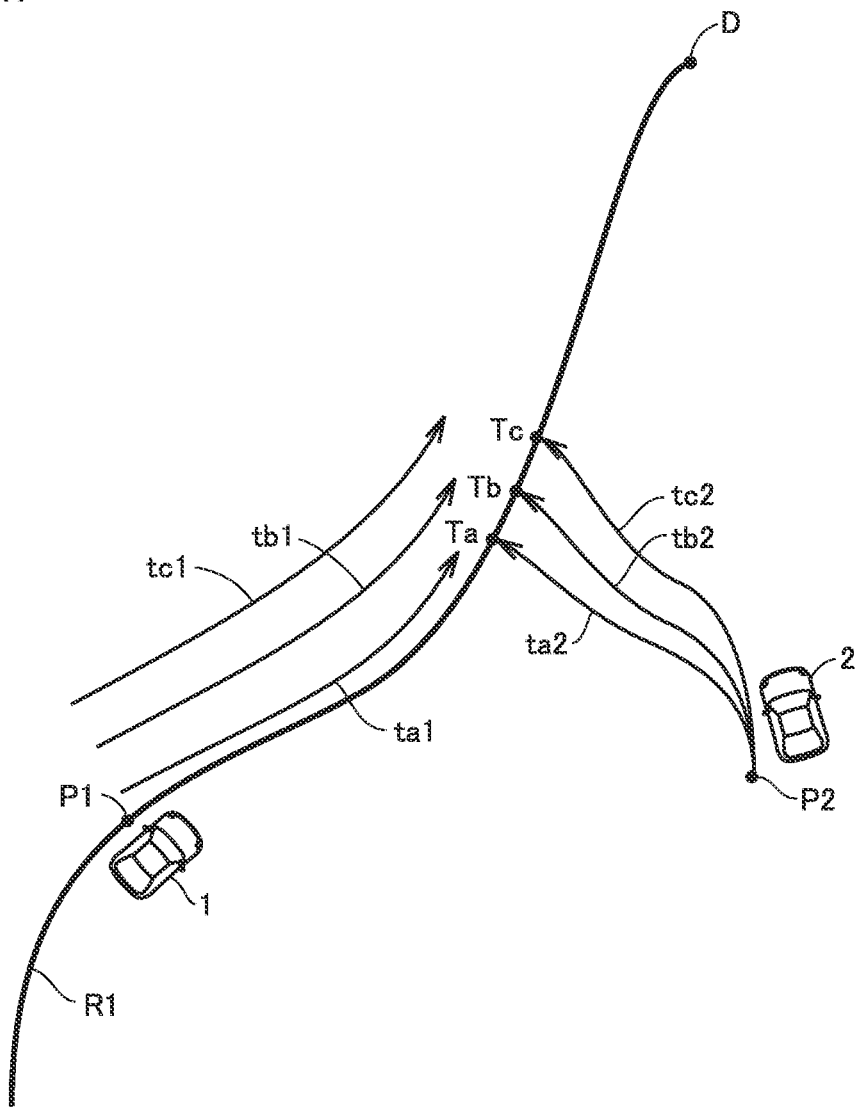
FIG. 7 is a diagram for explaining candidate vehicle-switching locations.

FIG. 7 is a diagram for explaining candidate locations. As shown in FIG. 7, three candidate locations Ta to Tc are selected for switching from vehicle 1 to vehicle 2, for example. Specifically, in switching between vehicles 1 and 2, both vehicles 1 and 2 need to be parked. Accordingly, some of the locations (three locations in this example) that are roughly the same distance from vehicle 1 and from vehicle 2 are set as candidate locations, in parking-permitted areas prescribed on the road map information.

Hereinafter, the expected periods of time required for vehicle 1 to travel from current location P1 to candidate locations Ta to Tc are respectively denoted by "ta1 to tc1". Also, the expected periods of time required for vehicle 2 to travel from current location P2 to candidate locations Ta to Tc are respectively denoted by "ta2 to tc2". Although not shown, candidate locations Te to Tf are set for the other vehicle, vehicle 4, as well. The candidate locations for vehicle 4 may be the same as the candidate locations for vehicle 2.

Referring back to FIG. 5, server 90 sends the positional information of candidate locations Ta to Tc to vehicle 2. Vehicle 2 executes a process of searching for paths to candidate locations Ta to Tc, and calculates required periods of time ta2 to tc2 to arrive at candidate locations Ta to Tc (S53).

FIG. 8 is a diagram showing example results of calculation by vehicle 2. Vehicle 2 sends, to server 90, information I2 including required periods of time ta2 to tc2 (for example, 10 minutes, 15 minutes, 17 minutes) as shown in FIG. 8.

Server 90 also sends the positional information of candidate locations Ta to Tc to vehicle 1. Further, server 90 sends, to vehicle 1, the positional information of charging station S located near candidate locations Ta to Tc. For providing the positional information of charging station S, the charging information contained in charging information data base 93 is used.

FIG. 9 is a diagram showing an example data structure of the charging information. With reference to FIG. 9, the charging information includes: identification information of a charging station; positional information of a charging station; and information on the number of chargers provided at a charging station. The charging information may further include a rate of use of chargers in each charging station (or information on the number of chargers available (available number)).

Server 90 selects charging station S located near candidate locations Ta to Tc by referring to the charging information. If there are a plurality of such charging stations S, server 90 may send information on the plurality of charging stations S. Alternatively, server 90 may consider the rate of use of the chargers or the available number of the chargers at each charging station S, and may preferentially send information on charging station S having a relatively low rate of use of the chargers (having a relatively large available number).

Upon receiving the positional information of charging station S and the positional information of candidate locations Ta to Tc, vehicle 1 executes the path search process. Vehicle 1 then calculates required periods of time ta1 to tc1 to arrive at candidate locations Ta to Tc and calculates the traveling routes from candidate locations Ta to Tc to charging station S (S54). Vehicle 1 then sends, to server 90, information I1 including the results of calculation at the process of S54.

FIG. 10 is a diagram showing example results of calculation by vehicle 1 (information I1). As shown in FIG. 10, information I1 from vehicle 1 includes: information on a candidate location (Ta to Tc); information on a required period of time (for example, 4 minutes, 11 minutes, 18 minutes) to arrive at a candidate location; identification information (for example, st2, st3) of charging station S to which vehicle 1 is to go after vehicle switching; and information on a traveling route from a candidate location to charging station S.

Server 90 receives information I1 from vehicle 1 and information I2 from vehicle 2. Although FIG. 5 illustrates a case in which server 90 receives information I2 from vehicle 2 first and then receives information I1 from vehicle 1, information I1 and information I2 may be received in any order. Server 90 may receive information I1 from vehicle 1 first, and then receive information I2 from vehicle 2.

Server 90 narrows down the combinations of candidate switched vehicles and candidate locations based on information I1 and I2 (S55). Further, server 90 selects any one of the combinations narrowed down at S55, based on the self-driving information contained in self-driving information data base 94 (S56).

FIG. 11 is a diagram showing an example method, by server 90, of narrowing down the candidate switched vehicles and the candidate locations. With reference to FIG. 11, server 90 calculates a time difference $\Delta t$ between the required period of time for vehicle 1 (user vehicle) to arrive at a candidate location and the required period of time for each of vehicles 2 and 4 (vehicles traveling for pickup) to arrive at the candidate location. As an example, with respect to candidate location Ta at which to switch from vehicle 1 to vehicle 2, if the required period of time of vehicle 1 is 4 minutes and the required period of time of vehicle 2 is 10 minutes, then time difference $\Delta t$ between these required periods of time is −6 minutes (that is, vehicle 1 will arrive 6 minutes earlier than vehicle 2). Such time difference $\Delta t$ is calculated for each candidate switched vehicle and each candidate location.

Excessively large time difference $\Delta t$ means that one of vehicles 1 and 2 has to wait for a long time at a candidate location until the other of vehicles 1 and 2 arrives there, which precludes efficient vehicle switching. Accordingly, server 90 determines a combination of a candidate switched vehicle and a candidate location to be an "available option" if its time difference $\Delta t$ has an absolute value of within a predetermined value, whereas server 90 determines a combination of a candidate switched vehicle and a candidate location to be an "unavailable option" if its time difference $\Delta t$ has an absolute value of larger than the predetermined value. For example, a combination whose time difference $\Delta t$ has an absolute value of within 3 minutes is determined to be an available option (indicated by OK), whereas a combination whose time difference $\Delta t$ has an absolute value of larger than 3 minutes is determined to be an unavailable option (indicated by NG). As a result, in the case shown in FIG. 11, combinations of candidate switched vehicles and candidate locations are narrowed down to three, for example.

FIG. 12 is a diagram showing an example data structure of self-driving information. With reference to FIG. 12, for each of various traveling routes (for example, traveling routes from candidate locations to a charging station), the self-driving information includes: information on presence or absence of a map for self-driving created in advance (self-driving map information); information on the number of self-driving vehicles that traveled by the traveling route in the past (self-driving history information); and information on a traffic volume of the traveling route (traffic volume information), for example.

The self-driving history information is graded on a scale of one to ten, in such a way that a traveling route with a larger number of vehicles that have traveled has a higher score, for example. The traffic volume information is also graded on a scale of one to ten, in such a way that a traveling route with a smaller traffic volume has a higher score. For each traveling route, a "reliability index" is defined that indicates reliability about whether or not a vehicle can complete a travel by self-driving by the traveling route and successfully arrive at a destination on the traveling route, based on the self-driving map information, the self-driving history information, and the traffic volume information. The reliability index corresponds to an "index value" according to the present disclosure.

The reliability index is obtained by multiplying the grade in each of the self-driving map information, the self-driving history information, and the traffic volume information by a weighting coefficient, and comprehensively evaluating the reliability of self-driving on a scale of one to ten. A reliability index of a certain traveling route is calculated to be higher when the traveling route has a map for self-driving created in advance, has a larger number of self-driving vehicles that traveled by the traveling route in the past, and has a smaller traffic volume. The example shown in FIG. 12 shows that the traveling route denoted by the identification information of R1001 has the highest reliability index and is thus most suitable for self-driving.

In the example shown in FIG. 11, server 90 compares the reliability indexes of the traveling routes from candidate locations to a charging station of vehicle 1, for the three combinations of candidate switched vehicles and candidate locations selected to satisfy the time difference Δt condition. Server 90 determines to adopt the combination corresponding to the traveling route that has the highest reliability index, from among the three combinations (S56 in FIG. 5). In this example, candidate location Tc of vehicle 2 is determined to be adopted as vehicle-switching location T. When vehicle-switching location T is determined, server 90 sends the positional information of vehicle-switching location T to both vehicles 1 and 2.

Here a case has been described in which the combinations of candidate switched vehicles and candidate locations are narrowed down based on the time difference Δt condition, and in which the combination having the highest reliability index is adopted from among these combinations. The adoption of the combination having the highest reliability index, however, is not essential.

For example, if a reliability index exceeds a reference value (5 in the case shown in FIG. 12, for example) in two of the three combinations, one of the two combinations that has a smaller time difference Δt may be adopted even if the combination has a relatively small reliability index. In other words, from among the candidate locations whose reliability indexes exceed a reference value, a candidate having the smallest time difference Δt may be determined to be a vehicle-switching location.

If a reliability index exceeds a reference value in two of the three combinations for example, server 90 may provide a user with information on the vehicle-switching locations and time differences Δt of the two combinations via portable terminal 8 or navigation device 50. The user may select any one of the combinations based on the information on the vehicle-switching locations and time differences Δt. The user may select, for example, a more convenient location or a safer location as a vehicle-switching location. The user may select a location having smaller time difference Δt. Further, the user may select a desired vehicle-switching location by considering both the characteristics of a vehicle-switching location (e.g. regional characteristics) and time difference Δ.

Further, if there are a plurality of vehicles that can be adopted as a switched vehicle, server 90 may send information on these vehicles (for example, information including the vehicle type) to portable terminal 8 of the user. The user may select a desired vehicle based on, for example, the vehicle type information from among the plurality of vehicles.

Referring back to FIG. 4, when vehicle-switching location T is determined, each of vehicles 1 and 2 travels toward the determined vehicle-switching location T (S35, S41). When arriving at vehicle-switching location T (S42), vehicle 2 notifies server 90 of the arrival at vehicle-switching location T. The notification is sent to portable terminal 8 of the user via server 90. The user thus knows that vehicle 2 is standing by at vehicle-switching location T.

Then, when vehicle 1 arrives at vehicle-switching location T (S35), the arrival of vehicle 1 at vehicle-switching location T is notified from vehicle 1 to server 90. Thus, server 90 can recognize that both vehicles 1 and 2 have duly arrived at vehicle-switching location T. Note that the order of arrival of vehicles 1 and 2 at vehicle-switching location T may be reversed as described with reference to FIG. 11.

At vehicle-switching location T, vehicles 1 and 2 execute coupling control for smooth positioning between vehicles 1 and 2 (S60). The coupling control is described in detail with reference to FIG. 13A to FIG. 13D.

The user switches from vehicle 1 to vehicle 2 (S13). Vehicle 2 travels toward destination D with the user on board (S43) and then arrives at destination D (S44). Vehicle 1, on the other hand, travels toward charging station S by a traveling route having high reliability (S36). When vehicle 1 arrives at charging station S (S37), power storage device 10 mounted on vehicle 1 is externally charged, although not shown.

FIG. 13A to FIG. 13D are diagrams illustrating the coupling control at the time of vehicle switching (the control at S60 shown in FIG. 4). Vehicles 1 and 2 which have received the positional information of vehicle-switching location T from server 90 travel toward vehicle-switching location T. At this time, when the position of the own vehicle identified by navigation device 50 reaches the neighborhood of vehicle-switching location T, routing assistance by navigation device 50 is ended. In general, positional information (GPS information) obtained by navigation device 50 includes an error to some extent. Accordingly, in what relative positions vehicle 1 and vehicle 2 should be parked is a problem. Vehicle 1 and vehicle 2 may be parked at a distance from each other at or around vehicle-switching location T. In such a case, a user may have trouble in switching vehicles (or transshipping luggage between vehicles) in bad weather, or vehicles 1 and 2 may occupy a parking space and obstruct other vehicles' traveling during the vehicle switching, for example. In order to solve such problems, the coupling control is executed.

Figure 13A:
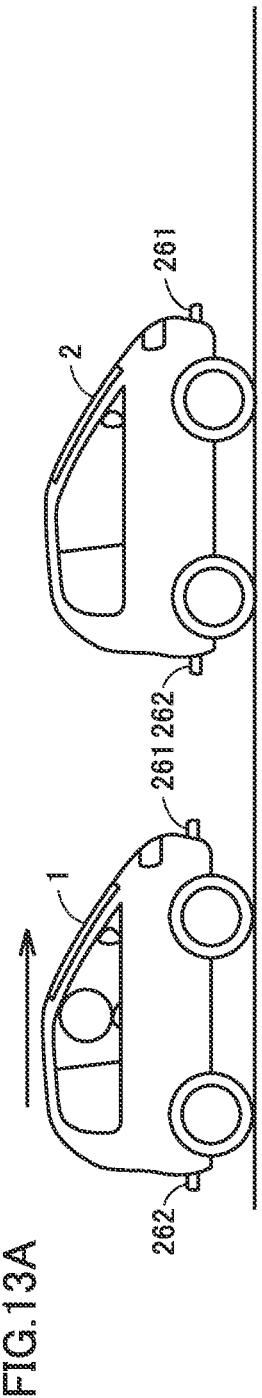
FIG. 13A is a diagram showing coupling control at the time of vehicle switching (the first diagram).
Figure 13B:
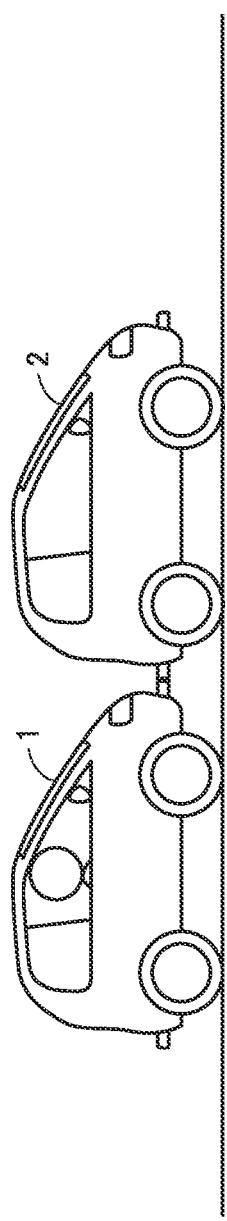
FIG. 13B is a diagram showing coupling control at the time of vehicle switching (the second diagram).

With reference to FIG. 13A, an example situation is described in which vehicle 2 arrives at vehicle-switching location T, after which vehicle 1 arrives there, and vehicle 1 approaches vehicle 2 from behind vehicle 2. First, vehicle 1 identifies vehicle 2 as a switched vehicle. For this identification, vehicle 1 and vehicle 2 may communicate with each other, or camera 61 mounted on vehicle 1 may capture an image of vehicle 2, or both the communication and camera 61 may be used. Each of vehicles 1 and 2 has a coupler 261 at its front part and a coupler 262 at its rear part. Coupler 261 and coupler 262 are configured to couple with each other.

When identifying rear coupler 262 of vehicle 2 using camera 61, vehicle 1 moves at a reduced speed aiming at coupler 262. When front coupler 261 of vehicle 1 and rear coupler 262 of vehicle 2 couple with each other, vehicle 1 stops (see FIG. 13B).

The control for coupling coupler 261 and coupler 262 to each other is described in detail. Before coupling, vehicle 1 produces a target path to coupler 262. In producing the target path, consideration is desirably given to the fact that, strictly speaking, there is a difference between the position of vehicle 1 recognized by vehicle 1 itself and the position of coupler 262 on vehicle 1.

For example, based on GPS information identified by navigation device 50, vehicle 1 can obtain the approximate position of vehicle 1 (including a GPS error). This positional information is corrected by using information obtained by various types of sensors such as camera 61, radar 62, and LIDAR 63, and thus the accurate position of vehicle 1 (referred to as an own position) can be obtained. In vehicle 1, the positional relationship between a reference position for calculating the own position (for example, a position identified by GPS information) and the position of coupler 261 can be obtained from the specification of vehicle 1 in advance. Therefore, the position of coupler 261 can be accurately calculated by using the own position of vehicle 1 and the above positional relationship. The path that connects the calculated position of coupler 261 of vehicle 1 and the position of coupler 262 of vehicle 2 to each other is defined as a target path. Vehicle 1 autonomously travels along the target path to couple with coupler 262.

Further, speed control may be executed in such a way that the speed of vehicle 1 gradually reduces as coupler 261 of vehicle 1 gets closer to coupler 262. This enables more reliable coupling between coupler 261 and coupler 262.

Upon coupling of couplers 261 and 262, vehicle 1 determines that vehicles 1 and 2 are ready for switching and permits the user to get off vehicle 1. For example, vehicle 1 may instruct the user in vehicle 1 to switch vehicles, by means of voice output from a speaker (not shown), and may release a door lock (not shown).

Figure 13C:
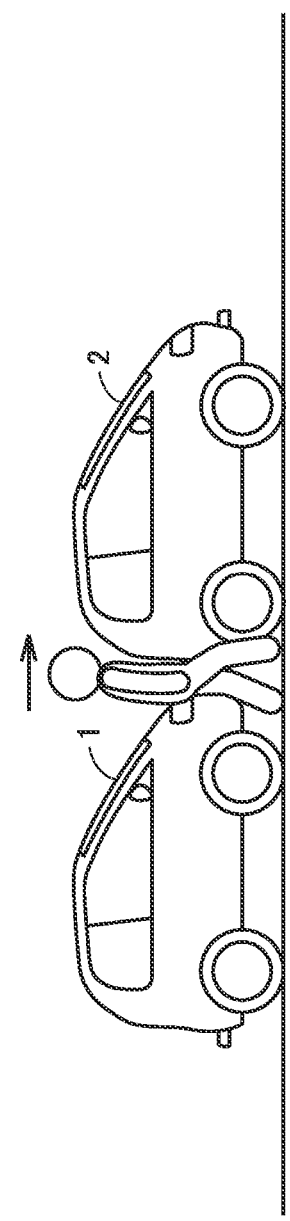
FIG. 13C is a diagram showing coupling control at the time of vehicle switching (the third diagram).
Figure 13D:
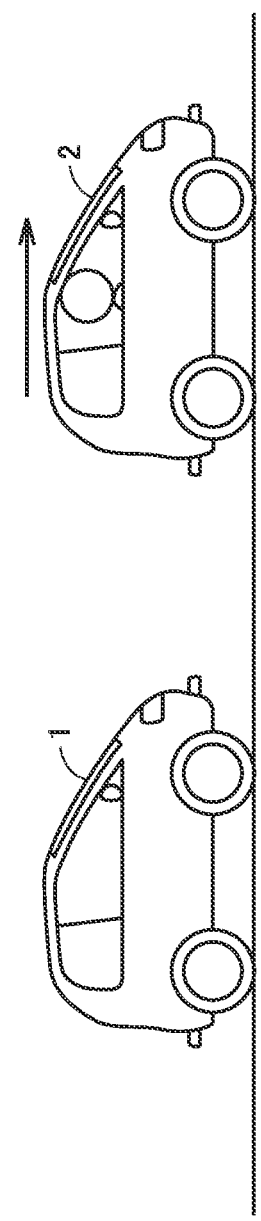
FIG. 13D is a diagram showing coupling control at the time of vehicle switching (the fourth diagram).

The user switches from vehicle 1 to vehicle 2 (see FIG. 13C). For example, a decrease in weight is detect by a weight sensor (not shown) mounted on vehicle 1, after which an increase in weight is detected by a weight sensor mounted on vehicle 2, and such detection is shared via communication between vehicles 1 and 2. Upon the sharing, vehicle 2 determines that the user's vehicle switching has completed. Vehicle 2 then releases the coupling between coupler 261 and coupler 262 and starts traveling toward destination D (see FIG. 13D). The positional information of destination D to be provided to vehicle 2 may have been sent from server 90 in advance or may be input again by the user.

Vehicle 1, on the other hand, starts self-driving toward charging station S. At this time, vehicle 1 desirably sends a notification to server 90 to the effect that vehicle 1 is incapable of traveling to another user's location (traveling for pickup) due to an insufficient remaining amount in power storage device 10.

Such coupling control enables detailed determination of the parking positions of vehicles 1 and 2. Since vehicle 1 and vehicle 2 are parked close to each other, the user can conveniently switch vehicles and vehicles 1 and 2 are prevented from obstructing other vehicles' traveling. Note that, however, the coupling control is not essential for switching from vehicle 1 to vehicle 2 but is optional.

As described above, according to the present embodiment, vehicle 1 starts traveling toward destination D with a user on board, even if the remaining amount in power storage device 10 of vehicle 1 is not sufficient to travel to destination D. The user switches from vehicle 1 to vehicle 2 at vehicle-switching location T, and then vehicle 2 travels toward destination D with the user on board. This eliminates the need for the user to wait for external charging of power storage device 10, and thus enables early arrival at destination D.

After dropping the user off at vehicle-switching location T, vehicle 1 travels toward charging station S for external charging. A location selected as vehicle-switching location T is a location having a high reliability index and such that the traveling route from vehicle-switching location T to charging station S is suitable for self-driving. Thus, vehicle 1 can more reliably arrive at charging station S. Ensuring external charging of vehicle 1 allows vehicle 1 to be dispatched to a next user. This enables continuous management of the vehicle dispatch system.

The present embodiment describes a case in which traveling of vehicles 1 and 2 is carried out entirely by full self-driving (full-automated driving). However, full self-driving is required only for traveling of vehicle 1 from vehicle-switching location T to charging station S and for traveling of vehicle 2 to vehicle-switching location T. In other words, traveling of vehicle 1 to vehicle-switching location T and traveling of vehicle 2 from vehicle-switching location T to destination D may be carried out by user's driving (manned driving).

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle dispatch system comprising:
   a first vehicle and a second vehicle, each of which is an electric vehicle including a power storage device and configured to perform self-driving; and
   a server configured to communicate with the first vehicle and the second vehicle,
   when the first vehicle with a user on board becomes undrivable due to insufficient power in the power storage device before arriving at a destination, the server being configured to:
      use first information, second information, and third information to set a vehicle-switching location between a current location of the first vehicle and the destination, the vehicle-switching location being a location where the user switches from the first vehicle to the second vehicle; and
      send an instruction for dispatching the second vehicle to the vehicle-switching location,
   after the second vehicle joins the first vehicle at the vehicle-switching location in accordance with the instruction, the second vehicle traveling toward the destination with the user on board,
   after the user gets off the first vehicle, the first vehicle traveling by self-driving toward charging equipment capable of charging the power storage device,
   the first information being positional information of the charging equipment,
   the second information being information on a self-driving route of the first vehicle from the vehicle-switching location to the charging equipment,
   the third information being information on an index value indicating reliability about whether or not the first vehicle arrives at the charging equipment by self-driving by the self-driving route,
   the server being configured to determine the vehicle-switching location using the index value.

2. The vehicle dispatch system according to claim 1, wherein, when there are a plurality of candidates for the vehicle-switching location, the server is configured to determine a candidate having the highest index value, to be the vehicle-switching location.

3. The vehicle dispatch system according to claim 1, wherein, when there are a plurality of candidates for the vehicle-switching location having the index value higher than a reference value, the server is configured to determine a candidate having a smallest time difference between an arrival time of the first vehicle at the vehicle-switching location and an arrival time of the second vehicle at the vehicle-switching location, to be the vehicle-switching location.

4. The vehicle dispatch system according to claim 1, further comprising an input/output device configured to provide the user with information received from the server via communication with the server, and receive an operation from the user, wherein
   when there are a plurality of candidates for the vehicle-switching location having the index value higher than a reference value, the input/output device is configured to receive the operation from the user for selecting a candidate from among the plurality of candidates and send a result of the received operation to the server, and the server is configured to determine the candidate selected by the user, to be the vehicle-switching location.

5. The vehicle dispatch system according to claim 1, wherein the first vehicle includes a first coupler, the second vehicle includes:
- a second coupler configured to couple with the first coupler; and
- a detection device configured to detect the user getting on the second vehicle, the first vehicle and the second vehicle join each other with the first coupler and the second coupler coupling with each other at the vehicle-switching location, and when the detection device detects the user getting on the second vehicle, the second vehicle is configured to release coupling between the first coupler and the second coupler and start traveling by self-driving.

6. A vehicle dispatch apparatus comprising:

a communication device configured to communicate with a first vehicle and a second vehicle, each of which is an electric vehicle configured to perform self-driving; and a processor configured to, when the first vehicle with a user on board becomes undrivable due to insufficient power in a power storage device before arriving at a destination, use first information, second information, and third information to set a vehicle-switching location between a current location of the first vehicle and the destination, the vehicle-switching location being a location where the user switches from the first vehicle to the second vehicle; and send an instruction for dispatching the second vehicle to the vehicle-switching location, after the second vehicle joins the first vehicle at the vehicle-switching location in accordance with the instruction, the second vehicle traveling toward the destination with the user on board, after the user gets off the first vehicle, the first vehicle traveling by self-driving toward charging equipment capable of charging the power storage device, the first information being positional information of the charging equipment, the second information being information on a self-driving route of the first vehicle from the vehicle-switching location to the charging equipment, the third information being information on an index value indicating reliability about whether or not the first vehicle arrives at the charging equipment by self-driving by the self-driving route, the processor being configured to determine the vehicle-switching location using the index value.

7. A vehicle dispatch method for a first vehicle and a second vehicle, each of which is an electric vehicle configured to perform self-driving, the method comprising, when the first vehicle with a user on board becomes undrivable due to insufficient power in a power storage device before arriving at a destination:

using information to set a vehicle-switching location between a current location of the first vehicle and the destination, the vehicle-switching location being a location where the user switches from the first vehicle to the second vehicle, the information being on an index value indicating reliability about whether or not the first vehicle travels by self-driving from the vehicle-switching location to arrive at charging equipment capable of charging the power storage device;

sending an instruction for dispatching the second vehicle to the vehicle-switching location;

allowing the second vehicle that has joined the first vehicle at the vehicle-switching location in accordance with the instruction to travel toward the destination with the user on board; and allowing the first vehicle to travel by self-driving toward the charging equipment after the user gets off the first vehicle.

* * * * *